US008214251B2

(12) United States Patent
Handley (10) Patent No.: US 8,214,251 B2
(45) Date of Patent: Jul. 3, 2012

(54) METHODS AND SYSTEMS OF ORGANIZING VENDORS OF PRODUCTION PRINT SERVICES BY RATINGS

(75) Inventor: John C. Handley, Fairport, NY (US)

(73) Assignee: Xerox Corporation, Norwalk, CT (US)

( * ) Notice: Subject to any disclaimer, the term of this patent is extended or adjusted under 35 U.S.C. 154(b) by 1214 days.

(21) Appl. No.: 11/770,143

(22) Filed: Jun. 28, 2007

(65) Prior Publication Data
US 2009/0006176 A1 Jan. 1, 2009

(51) Int. Cl.
G06Q 30/00 (2006.01)
(52) U.S. Cl. ............................. 705/10; 705/7; 705/11
(58) Field of Classification Search ............. 705/7, 10, 705/11
See application file for complete search history.

(56) References Cited

U.S. PATENT DOCUMENTS

| 5,317,741 | A   |   | 5/1994  | Schwanke |         |
|-----------|-----|---|---------|----------|---------|
| 6,895,405 | B1  | * | 5/2005  | Choi et al. | 1/1  |
| 6,916,180 | B1  |   | 7/2005  | Price et al. |     |
| 6,952,679 | B1  |   | 10/2005 | Pulford  |         |
| 7,406,436 | B1  | * | 7/2008  | Reisman  | 705/7.32 |
| 2003/0086108 | A1 | * | 5/2003 | Barkis  | 358/1.13 |
| 2004/0054572 | A1 | * | 3/2004 | Oldale et al. | 705/10 |
| 2004/0076936 | A1 | * | 4/2004 | Horvitz et al. | 434/236 |
| 2004/0101451 | A1 | * | 5/2004 | Ament et al. | 422/173 |
| 2005/0246740 | A1 | * | 11/2005 | Teraci et al. | 725/45 |
| 2007/0033092 | A1 |   | 2/2007 | Iams |         |
| 2007/0118546 | A1 | * | 5/2007 | Acharya | 707/101 |
| 2007/0203783 | A1 | * | 8/2007 | Beltramo | 705/10 |
| 2007/0265803 | A1 | * | 11/2007 | Kotsovinos et al. | 702/182 |
| 2008/0228555 | A1 | * | 9/2008 | Penke et al. | 705/10 |

OTHER PUBLICATIONS

Luenberger, Introduction to Linear and Nonlinear Programming, pp. 11-67, Addison-Wesley Publishing Company, Reading, Massachusetts.
Mallows, "A Note on Asymptotic Joint Normality", The Annals of Mathematical Statistics, Apr. 1972, pp. 508-515, vol. 43, No. 2, Institute of Mathematical Statistics.
Lin, "Divergence Measures Based on the Shannon Entropy", IEEE Transactions of Information Theory, Jan. 1991, pp. 145-151, vol. 47, No. 1.

* cited by examiner

Primary Examiner — Nga B. Nguyen
(74) Attorney, Agent, or Firm — Fox Rothschild LLP (57) ABSTRACT

Methods and systems of evaluating customer satisfaction with a plurality of print-related items are disclosed. A plurality of evaluator ratings, each including an ordinal scale value, may be received for each print-related item in a set. A rating distribution may be determined for each print-related item based on the received evaluator ratings. A similarity value between the rating distribution for the print-related item and each other print-related item may also be determined. The set of print-related items may be divided into one or more clusters based on the corresponding similarity values. A comparison of the one or more clusters may be displayed. The comparison may include a comparison of the similarity values and/or a rating variability between rating distributions associated with the print-related items in one or more clusters and/or a comparison of average rating distributions associated with one or more clusters.

21 Claims, 6 Drawing Sheets

| Product/Evaluator | E1 | E2 | E3 | E4 | E5 | E6 | E7 | E8 | E9 | E10 |
|---|---|---|---|---|---|---|---|---|---|---|
| A | 1 | 4 | 5 | 4 | 4 | 4 | 5 | 4 | 3 | 4 |
| B | 3 | 2 | 3 | 1 | 1 | 1 | 5 | 5 | 5 | 5 |
| C | 1 | 2 | 4 | 3 | 2 | 3 | 4 | 3 | 3 | 3 |

FIG. 1

| Product/Rating | '0' | '1' | '2' | '3' | '4' | '5' |
|---|---|---|---|---|---|---|
| A | 0 | 0.1 | 0 | 0.1 | 0.6 | 0.2 |
| B | 0 | 0.3 | 0.1 | 0.2 | 0 | 0.4 |
| C | 0 | 0.1 | 0.2 | 0.5 | 0.2 | 0 |

FIG. 2

| i | j | X | Y | $f_{ij}$ | $f_{ij}\|x_i - y_j\|^2$ |
|---|---|---|---|---|---|
| 1 | 1 | 6 | 4 | 0.00 | 0.00 |
| 1 | 2 | 6 | 5 | 0.00 | 0.00 |
| 1 | 3 | 6 | 2 | 0.00 | 0.00 |
| 1 | 4 | 6 | 0 | 0.05 | 0.45 |
| 1 | 5 | 6 | 1 | 0.07 | 0.63 |
| 1 | 6 | 6 | 10 | 0.15 | 2.4 |
| 2 | 1 | 7 | 4 | 0.00 | 0.00 |
| 2 | 2 | 7 | 5 | 0.10 | 0.4 |
| 2 | 3 | 7 | 2 | 0.06 | 1.5 |
| 2 | 4 | 7 | 3 | 0.05 | 0.8 |
| 2 | 5 | 7 | 3 | 0.02 | 0.32 |
| 2 | 6 | 7 | 10 | 0.09 | 0.81 |
| 3 | 1 | 8 | 4 | 0.15 | 2.4 |
| 3 | 2 | 8 | 5 | 0.09 | 0.81 |
| 3 | 3 | 8 | 2 | 0.01 | 0.36 |
| 3 | 4 | 8 | 3 | 0.01 | 0.25 |
| 3 | 5 | 8 | 3 | 0.02 | 0.5 |
| 3 | 6 | 8 | 10 | 0.08 | 0.32 |
| 4 | 1 | 0 | 4 | 0.00 | 0.00 |
| 4 | 2 | 0 | 5 | 0.00 | 0.00 |
| 4 | 3 | 0 | 2 | 0.00 | 0.00 |
| 4 | 4 | 0 | 3 | 0.00 | 0.00 |
| 4 | 5 | 0 | 3 | 0.00 | 0.00 |
| 4 | 6 | 0 | 10 | 0.00 | 0.00 |
| 5 | 1 | 1 | 4 | 0.00 | 0.00 |
| 5 | 2 | 1 | 5 | 0.00 | 0.00 |
| 5 | 3 | 1 | 2 | 0.00 | 0.00 |
| 5 | 4 | 1 | 3 | 0.00 | 0.00 |
| 5 | 5 | 1 | 3 | 0.00 | 0.00 |
| 5 | 6 | 1 | 10 | 0.05 | 4.05 |
| | | | | TOTAL | 16 |

METHODS AND SYSTEMS OF ORGANIZING VENDORS OF PRODUCTION PRINT SERVICES BY RATINGS

BACKGROUND

Customers are typically asked to assess the quality or effectiveness of a product or service through customer surveys, Web-based feedback forms or the like. Typically, customers are asked to rate a product or service using a scale, such as from zero to five. The average rating is usually determined by summing the ratings and dividing the sum by the total number of evaluators who rated the product or service. Determining the average in this manner can mislead customers as to the quality of the product or service, however, especially when the rating distribution is bimodal, or has a large number of low ratings and a large number of high ratings. For example, a product that receives two '1' ratings and two '5' ratings (on a scale from one to five) has the same average as a product that receives four '3' ratings.

In particular, if a product or service is offered by multiple vendors, consumers may rate the product or service very differently based on the vendor who provides the product or service. As such, it would be helpful to a potential consumer of a good or service if useful information were available regarding the effect of a vendor on consumer ratings. For example, a seller of printing devices may contract with several vendors to provide maintenance services on those devices. While the services may be identical, consumer satisfaction with the service may vary widely by vendor. If a method or system were available to assess consumer satisfaction of a service by vendor and compare the data of one vendor to others, the print device supplier could address issues with underperforming maintenance service vendors and thus improve customer satisfaction.

A broker may offer production print services including printing, binding, envelope insertions, three-hole drilling, etc. on behalf of clients. Production print services are contracted through a number of vendors, Clients may rate the performance of vendors according to a number of criteria including product quality, ability to satisfy service level agreements, and value. A broker would like to offer clients the best possible service and value by assessing vendor ratings and organize vendors into tiers or clusters of ones with similar ratings distributions.

Methods and systems for clustering and displaying product and service ratings by rating distribution would be desirable.

SUMMARY

Before the present methods are described, it is to be understood that this invention is not limited to the particular systems, methodologies or protocols described, as these may vary. It is also to be understood that the terminology used herein is for the purpose of describing particular embodiments only, and is not intended to limit the scope of the present disclosure which will be limited only by the appended claims.

It must be noted that as used herein and in the appended claims, the singular forms "a," "an," and "the" include plural reference unless the context clearly dictates otherwise. Thus, for example, reference to a rating is a reference to one or more ratings and equivalents thereof known to those skilled in the art, and so forth. Unless defined otherwise, all technical and scientific terms used herein have the same meanings as commonly understood by one of ordinary skill in the art. As used herein, the term "comprising" means "including, but not limited to."

In an embodiment, a method of evaluating customer satisfaction with a plurality of print-related items may include receiving a plurality of evaluator ratings for each print-related item in a set of print-related items, where each rating comprises an ordinal scale value. For each print-related item, a rating distribution may be determined by a computing device for the print-related item based on the received evaluator ratings. A similarity value between the rating distribution for the print-related item and for each other print-related item in the set of print-related items may be determined by a computing device. The set of print-related items may be divided into one or more clusters based on the corresponding similarity values. Each cluster may include one or more print-related items. A comparison of the one or more clusters may be displayed to a user. The comparison may include one or more of a comparison of the similarity values between one or more rating distributions associated with the one or more print-related items in one or more clusters, a comparison of rating variability between one or more rating distributions associated with the one or more print related items in one or more clusters, and a comparison of one or more average rating distributions associated with one or more clusters.

In an embodiment, a system of evaluating a plurality of print-related items may include a processor, a communication port in communication with the processor and a processor-readable storage medium in communication with the processor containing one or more programming instructions for performing a method of evaluating customer satisfaction with a plurality of print-related items. The method may include receiving a plurality of evaluator ratings for each print-related item in a set of print-related items, where each rating comprises an ordinal scale value. For each print-related item, a rating distribution may be determined by a computing devices for the print-related item based on the received evaluator ratings. A similarity value between the rating distribution for the print-related item and for each other print-related item in the set of print-related items may be determined by a computing device. The set of print-related items may be divided into one or more clusters based on the corresponding similarity values. Each cluster may include one or more print-related items. A comparison of the one or more clusters may be displayed to a user. The comparison may include one or more of a comparison of the similarity values between one or more rating distributions associated with the one or more print-related items in one or more clusters, a comparison of rating variability between one or more rating distributions associated with the one or more print related items in one or more clusters, and a comparison of one or more average rating distributions associated with one or more clusters.

DETAILED DESCRIPTION

Consumers of a certain item may be asked to evaluate the item by rating it on an ordinal scale. Items may include print-related items such as printing products, printing services and the like. Printing products may include printing devices such as printers, cutters, collators, binders and the like. Printing services may include document production services, document production maintenance services and the like. An ordinal scale may include numbers, letters, symbols or the like used to assign ranks to items. For example, a consumer of document production services may be asked to rate a service that is available from one or more document production vendors using an ordinal scale that includes values from one to five, with one representing the lowest rating and five representing the highest rating. Similarly, a seller of printing devices may contract with several vendors to provide maintenance services on those devices, for example. The seller, as well as other consumers of the maintenance services, may rate their satisfaction with the provided service.

Figure 1:
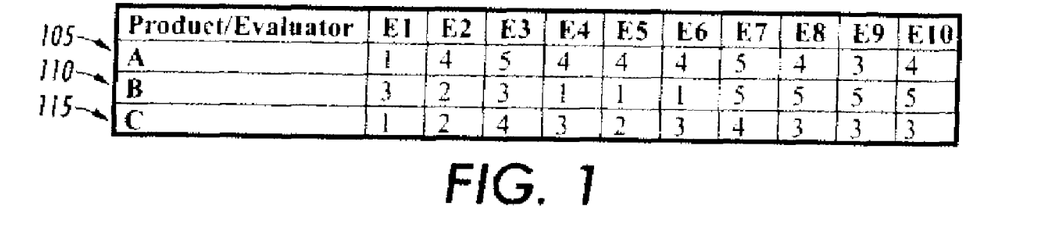
FIG. 1 depicts an exemplary chart of products and corresponding ratings according to an embodiment.

In an embodiment, consumers may be asked to rate a product or service on a scale from zero to five, with one representing the lowest rating, five representing the highest rating and zero representing a non-response, an inapplicable response or the like. Other values or rating scales may be used. FIG. 1 illustrates an exemplary chart of ratings provided by ten evaluators, E1-E10 100 corresponding to three products, A 105, B 110 and C 115.

In an embodiment, a rating distribution may be determined for each product based on the evaluator ratings. For each product, the number of consumers who selected each rating may be determined. A probability value may then be determined for each rating by dividing the number of evaluators who selected each rating by the total number of evaluators who rated the product.

In an embodiment, the lowest rating, in this case, '0' ratings, may be removed from a probability value calculation. For example, three evaluators may rate a product. The first evaluator may assign a '2' rating to the product, the second evaluator may assign a '3' rating to the product, and the third evaluator may assign a '0' rating to the product. An evaluator may use a '0' rating if the evaluator has no experience with the product being evaluated, if the evaluator would prefer not to rate the product or the like. A probability value may not be calculated for a '0' rating, and the total number of evaluators used to determine probability values for other ratings may be reduced by the number of evaluators who assigned a '0' rating. For example, in the above example, the probability value associated with the '2' rating may be 0.5 because 0.5 equals the number of evaluators who selected the '2' rating for the product (i.e., 1) divided by the total number of evaluators who rated the product less the number of evaluators who assigned a '0' rating to the product (i.e., 2).

Figure 2:
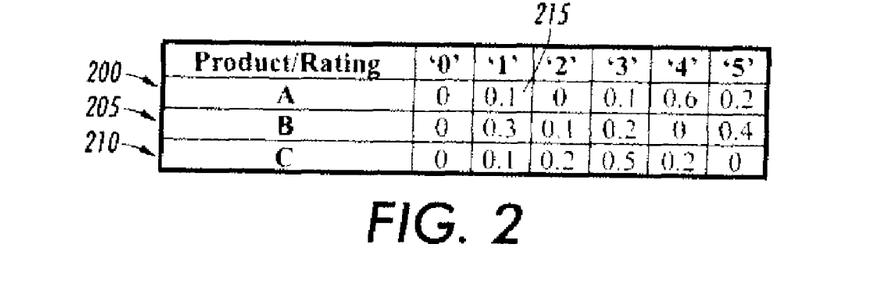
FIG. 2 depicts exemplary rating distributions for products based on exemplary ratings illustrated by FIG. 1.

FIG. 2 illustrates exemplary rating distributions for product A 200, product B 205 and product C 210 based on the ratings illustrated by FIG. 1. For example, referring back to FIG. 1, one evaluator (i.e., E1) assigned a '1' rating to product A 105, one evaluator (i.e., E9) assigned a '3' rating to product A, six evaluators (i.e., E2, E4, E5, E6, E8 and E10) assigned a '4' rating to product A and two evaluators (i.e., E3 and E7) assigned a '5' rating to product A. Evaluators E1-E10 100 rated product A, so the total number of evaluators is ten. As such, the probability associated with the '1' rating for product A may be 0.1 215 because 0.1 is equal to the number of consumers who selected the '1' rating for product A 200 (i.e., 1) divided by the total number of consumers who evaluated product A (i.e., 10). FIG. 2 illustrates the rating distributions for product B 205, product C 210 and the remainder of product A 200.

In an embodiment, the similarity between two ratings distributions may be determined using measures such as Jensen-Shannon divergence, Euclidean distance, Mallows distance or the like.

Jensen-Shannon divergence measures the similarity between two probability distributions, such as the ratings distributions illustrated in FIG. 2. If p represents a first probability distribution, and q represents a second probability distribution, then the Jensen Shannon divergence between p and q is represented by:

$$JS(p,q) = H(\alpha * p + (1-\alpha) * q) - \alpha * H(p) - (1-\alpha) * H(q),$$
$$0 \leq \alpha \leq 1$$

where H(p) represents the entropy of p and is represented by:

$$H(p) = -\sum_{i=1}^{n} p_i \log(p_i)$$

For example, p may represent the rating distribution for product A having values p=(0.1, 0.3, 0.2, 0.4), and q may represent the rating distribution for product B having values q=(0.4, 0.0, 0.5, 0.1). The similarity between the distributions of product A and product B may be determined using the above Jensen-Shannon divergence calculation. For example, $$\alpha = 1/2,$$

$$JS(p, q) = H\left(\frac{1}{2} * p + \frac{1}{2} * q\right) - \frac{1}{2} * H(p) - \frac{1}{2} * H(q) \text{ and}$$

$$H(p) = -\sum_{i=1}^{n} p_i \log(p_i).$$

As such, the following values may be determined:

$$\frac{1}{2} * p + \frac{1}{2} * q = (0.05, 0.15, 0.1, 0.2) + (0.2, 0.0, 0.25, 0.05)$$
$$= (0.25, 0.15, 0.35, 0.25)$$

$$H\left(\frac{1}{2} * p + \frac{1}{2} * q\right) = -0.25 * \log(0.25) - 0.15 * \log(0.15) -$$
$$0.35 * \log(0.35) - 0.25 * \log(0.25) = 1.345153$$

$$H(p) = -0.1 * \log(0.1) - 0.3 * \log(0.3) - 0.2 * \log(0.2) - 0.4 * \log(0.4) =$$
$$1.279854$$

$$H(q) = -0.4 * \log(0.4) - 0.0 * \log(0.0) - 0.5 * \log(0.5) - 0.1 * \log(0.2) =$$
$$0.9433484$$

$$H\left(\frac{1}{2} * p + \frac{1}{2} * q\right) - \frac{1}{2} * H(q) =$$
$$1.345153 - 1/2(1.279854) - \frac{1}{2}(0.9433484) = 0.065299$$

As such, the similarity between the distributions of product A and product B may be represented by the value 0.065299.

In an embodiment, a may represent α weight used to determine similarity between two distributions. The weight may be determined based on the type of evaluator who assigns ratings to a product or service. For example, if the ratings of a first rating distribution were provided by the ordinary consumers, the α associated with the first rating distribution may have a value of $$\frac{1}{2}.$$

However, if the ratings of second rating distribution were provided by experts, frequent purchasers, high spenders or the like, then the α associated with the second rating distribution may have a higher value such as $$\frac{2}{3}.$$

In an embodiment, Euclidean distance may be used to measure the distance between two probability distributions. If the probability distribution for product A is $p=(p_1, p_2, \ldots, p_n)$ and the probability distribution for product B is $q=(q_1, q_2, \ldots, q_n)$, then the Euclidean distance between p and q is defined as:

$$ED(p, q) = \sqrt{(p_1 - q_1)^2 + (p_2 - q_2)^2 + \ldots + (p_n - q_n)^2} = \sqrt{\left(\sum_{i=1}^{n} (p_i - q_i)^2\right)}$$

If $p=(0.1, 0.3, 0.2, 0.4)$ and $q=(0.4, 0.0, 0.5, 0.1)$, then the Euclidean distance between the distributions of product A and product B may be represented by:

$$ED(p, q) = \sqrt{(0.1 - 0.4)^2 + (0.3 - 0.0)^2 + (0.2 - 0.5)^2 + (0.4 - 0.1)^2} = 0.6$$

In an embodiment, a Mallows distance may measure the similarity between two probability distributions. The Mallows distance may be used to determine the similarity for probability distributions of two products or services rated according to different scales.

For example, product A may be rated on a scale from 1 to 5, and product B may be rated on a scale from 1 to 6. Exemplary rating counts for product A may be (6, 7, 8, 0, 1) if six people assigned a '1' rating to product A, seven people assigned a '2' rating to product A and so on. For a product B rated on a scale from 1 to 6, exemplary rating counts for product B may be (4, 5, 2, 3, 3, 10) where four people assigned a '1' rating to product B, five people assigned a '2' rating to product B and so on.

The corresponding probability distributions may be determined by dividing the number of evaluators who assigned a specific rating to a product by the total number of evaluators who rated that product.

If a ratings count for product A is represented by $X=(x_1, \ldots, x_m)$ and a ratings count for product B is represented by $Y=(y_1, \ldots, y_n)$, where m and n are possibly not equal, then:

$$p_i = \frac{x_i}{N_x}, i = 1, \ldots, m$$

$$q_i = \frac{y_i}{N_y}, i = 1, \ldots, n$$

where $\alpha \leq 1$, $$N_x = x_1 + x_2 + x_2 + \ldots + x_m,$$

$$N_y = y_1 + y_2 + \ldots + y_n$$

For example, the probability associated with rating '1' for product A may be 0.27 because 0.27 equals the number of evaluators who assigned a '1' rating to product A (i.e., 6) divided by the total number of evaluators of product A (i.e., 22). As such, the probability distribution for product A may be represented by $p=(0.27, 0.32, 0.36, 0.0, 0.05)$. Similarly, the probability distribution for product B may be represented by $q=(0.15, 0.19, 0.07, 0.11, 0.37)$.

The Mallows distance between the distributions for product A and product B may be represented by:

$$d_{Mallows}(X, Y; \alpha) = \min_{f_{ij}} \sum_{i=1}^{m} \sum_{j=1}^{n} f_{ij} |x_i - y_j|^\alpha \text{ such that}$$

$$f_{ij} \geq 0, 1 \leq i \leq m, 1 \leq j \leq n, \sum_{j=1}^{n} f_{ij} = p, 1 \leq i \leq m,$$

$$\sum_{i=1}^{m} f_{ij} = q, 1 \leq j \leq n, \sum_{i=1}^{m} \sum_{j=1}^{n} f_{ij} = 1$$

For this particular example, the f-values for the solution may be represented by Table 1:

TABLE 1

| | | | j | | |
| i | 1 | 2 | 3 | 4 | 5 |
| --- | --- | --- | --- | --- | --- |
| 1 | 0.00 | 0.00 | 0.15 | 0.00 | 0.00 |
| 2 | 0.00 | 0.10 | 0.09 | 0.00 | 0.00 |
| 3 | 0.00 | 0.06 | 0.01 | 0.00 | 0.00 |
| 4 | 0.05 | 0.05 | 0.01 | 0.00 | 0.00 |
| 5 | 0.07 | 0.02 | 0.02 | 0.00 | 0.00 |
| 6 | 0.15 | 0.09 | 0.08 | 0.00 | 0.05 |

The f-values may be determined by solving an optimization with the linear constrains discussed above. For example, referring to Table 1, the sum of column $$i = 1, \text{ or } \sum_{j=1}^{n} f_{ij} \text{ for } 1 \leq i \leq m, \text{ equals } p_1 \text{ or, in this example, } 0.27.$$

Likewise, the sum of row $$j = 1, \text{ or } \sum_{i=1}^{n} f_{ij} \text{ for } 1 \leq j \leq n, \text{ equals } q_1 \text{ or, in this example, } 0.15.$$

Figure 3:
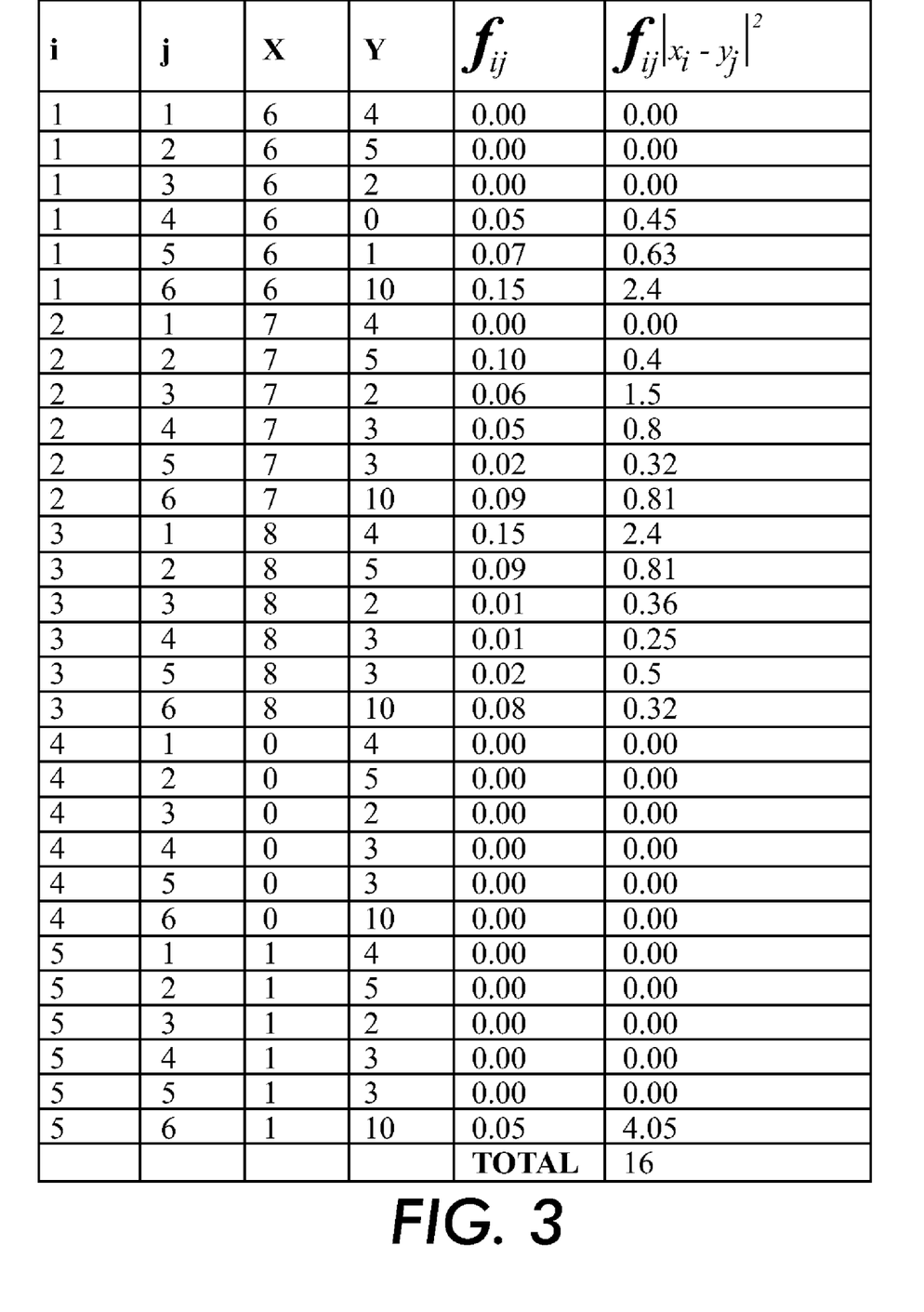
FIG. 3 illustrates exemplary values used in calculating the Mallows distance between two probability distributions according to an embodiment.

The Mallows distance may be determined by summing the values $f_{ij}|x_i - y_1|^\alpha$ for all values of i and j. FIG. 3 illustrates these calculations and the resulting sum, or Mallows distance, between the distributions for product A and product B when α=2.

In an embodiment, the products may be grouped into one or more clusters based on the corresponding similarity value. Products may be clustered using one or more clustering algorithms such as hierarchical agglomerative clustering, K-means clustering or the like.

Hierarchical agglomerative clustering may be performed by regarding each object as a separate cluster, then merging these atomic clusters into larger clusters until one or more predefined termination conditions are satisfied. At each step, the two most similar objects (clusters or single object) may be identified and merged into a larger cluster. Deciding which two clusters are closest may be performed using a measure of the distance between each remaining pair of clusters. Such proximity measure is called a linkage metric. Major inter-cluster linkage metrics include single link, complete link and average link.

A single link metric may measure the similarity of two clusters based on the distance between their closest (i.e., most similar) points. The single link metric may often generate long straggle clusters. $d(C_1,C_2)=\min\{d(x,y)|x\epsilon C_1, y\epsilon C_2\}$.

A complete link metric may measure the similarity of two clusters based on the similarity of their most distant (i.e., least similar) points. The complete link metric may tend to form compact clusters. $d(C_1,C_2)=\max\{d(x,y)|x\epsilon C_1, y\epsilon C_2\}$.

An average link metric may measure the similarity of two clusters based on the average similarity of the points contained in the clusters. $d(C_1,C_2)=\text{average}\{d(x,y)|x\epsilon C_1, y\epsilon C_2\}$.

The particular link metric used to measure similarity may have an effect on the clustering of the objects because different link metrics reflect different measures of closeness and connectivity. In an embodiment, values for a plurality of link metrics may be determined. Vendor data may be considered close to other vendor data, for example, if the distance between the data for each vendor is less than the distance between the data for the vendor and data for any other vendor. Relative "closeness" may depend on the nature of the data. Other methods of determining closeness may also be performed within the scope of the present disclosure.

Figure 4:
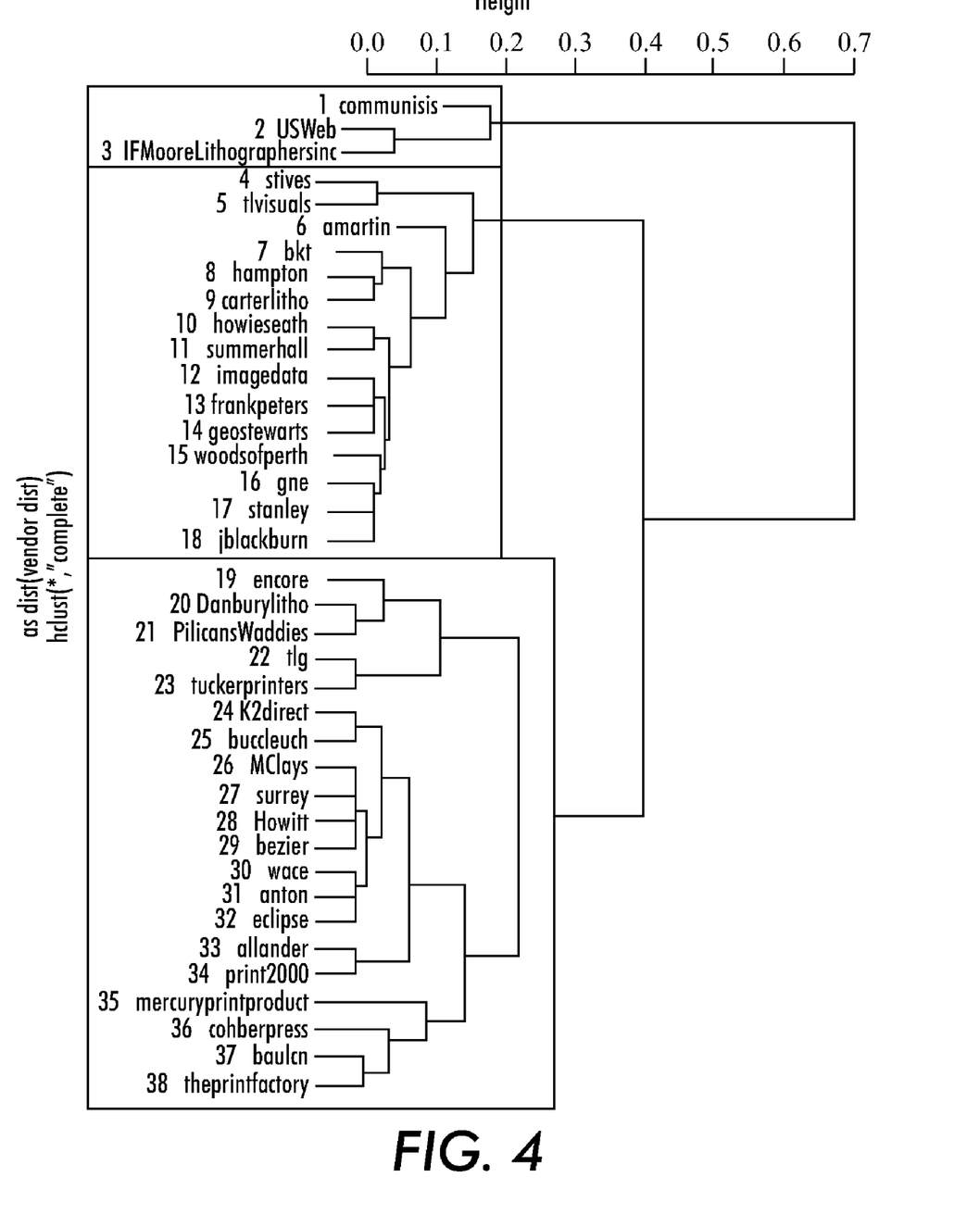
FIG. 4 depicts an exemplary dendrogram of clusters formed using hierarchical agglomerative clustering according to an embodiment.

FIG. 4 depicts an exemplary diagram of clusters formed using hierarchical agglomerative clustering. As illustrated in FIG. 4, 38 vendors were clustered based on the distance between the rating distributions for each vendor and/or cluster of vendors. Clusters may be determined by selecting a distance threshold between clusters. Clusters that exceed this threshold may be determined to be distinct. For example, a distance threshold of 0.3 may result in a determination of three clusters: {1, . . . , 3}, {4, . . . , 18} and {19, . . . , 38}. Likewise, a distance threshold of 0.2 may result in a determination of four clusters: {1, . . . , 3}, {4, . . . , 18}, {19, . . . , 23} and {24, . . . , 38}. Different distance thresholds may result in a different number of clusters.

In an embodiment, an optimal threshold may be determined by selecting the threshold that optimizes a measure of cluster separation and compactness. The optimal threshold may result in clusters that are tightly arranged about a center and distant from every other cluster.

In an embodiment, K-means clustering may be performed by first determining a value K equal to the number of clusters to find. Next, a set of initial cluster centers, $x_1, \ldots, x_K$, may be chosen. These may be chosen at random or by using a heuristic. For each point or vendor x in the dataset, the distances from that point to each of the centers may be computed: $d_i=d(x,x_i), i=1, \ldots, K$. Vendor x may be assigned to the cluster with the closest center. After all points or vendors have been assigned, each center may be re-determined by computing the medoid for each cluster. A medoid is a representative object of a data set determined by finding the center of a cluster and selecting the object that is closest to the center. After selecting the medoid, the distances between the medoid and the other points may be re-determined. For example, if the members of cluster i are determined to be $\{x_{i1}, \ldots, x_{in}\}$, the new center or medoid is the point or vendor y in the set which minimizes $$\sum_{j=1}^{n} d(y, x_{ij}).$$

The new centers for each cluster are used to assign all the points or vendors to the cluster with the closest center. The process is repeated until the cluster centers do not change after each iteration.

Figure 5:
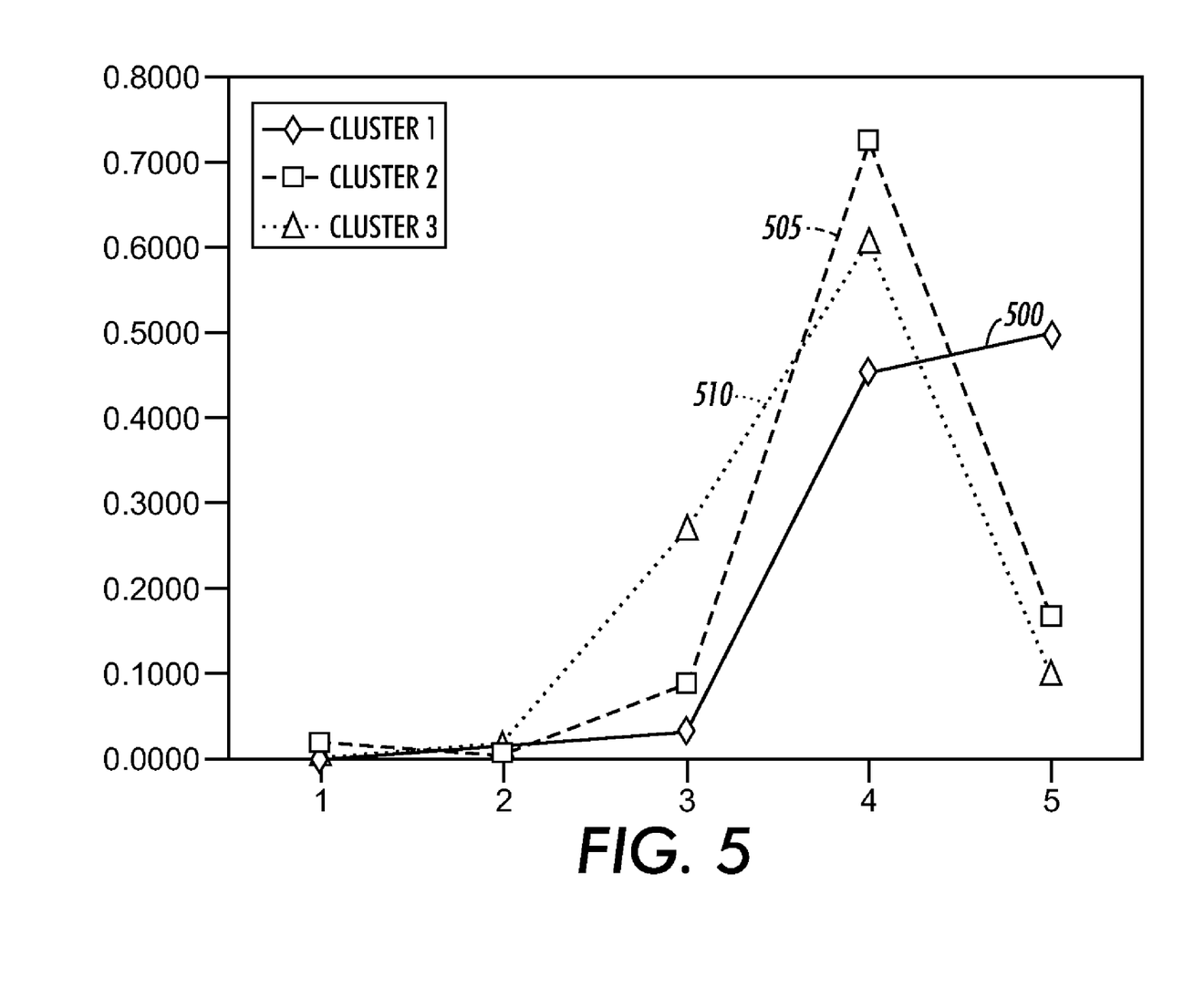
FIG. 5 depicts an exemplary graph of probability distributions for evaluated products according to an embodiment.

In an embodiment, a dendrogram of the determined clusters, such as that illustrated in FIG. 4, may be displayed to a user. A graph of cluster rating distributions for each cluster, such as that illustrated in FIG. 5, may also be displayed to a user. A cluster rating distribution may be determined by averaging the rating distributions of the items in the cluster. In an embodiment, a graph similar to that depicted in FIG. 5 may be displayed when a user clicks on a dendrogram similar to that depicted in FIG. 4. Alternatively, a graph may be displayed with a dendrogram. As illustrated by FIG. 5, a user may be provided with a rating associated with a product and also a range of ratings associated with the product. For example, cluster 1 500 may comprise the best products and/or services, in this example, vendors, which have a high average rating and ratings which are consistently high. Cluster 2 505 may comprise vendors with average ratings and a small variance in the range of ratings. Cluster 3 510 may comprise vendors with a larger average rating range, and may therefore be considered the worst cluster. As such, a user may discern from the graph that the vendors in cluster 1 500 received consistently high ratings, that the vendors in cluster 2 505 received consistently average ratings and that the vendors in cluster 3 510 received inconsistently average ratings.

Figure 6:
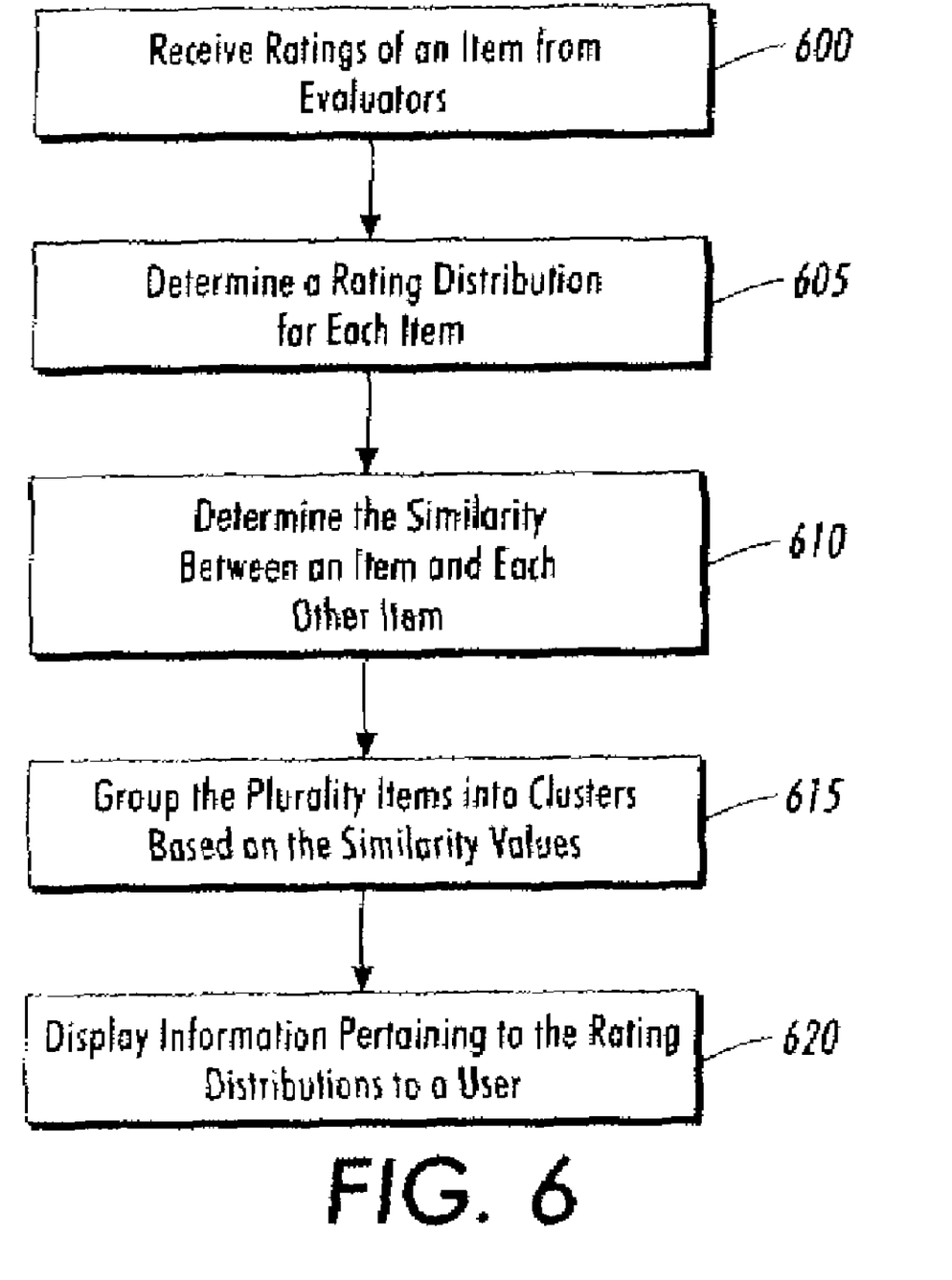
FIG. 6 depicts an exemplary flow chart of evaluating a plurality of items according to an embodiment.

FIG. 6 depicts an exemplary flow chart according to the disclosed embodiments. A plurality of evaluator ratings for each print-related item in a set of print-related items may be received 600 and the ratings may be used to determine 605 a rating distribution for each print-related item. The similarity between the rating distributions for two print-related items may be determined 610 and the print-related items may be divided 615 into clusters based on the similarity values. A comparison of the clusters may be displayed 620 to a user.

Figure 7:
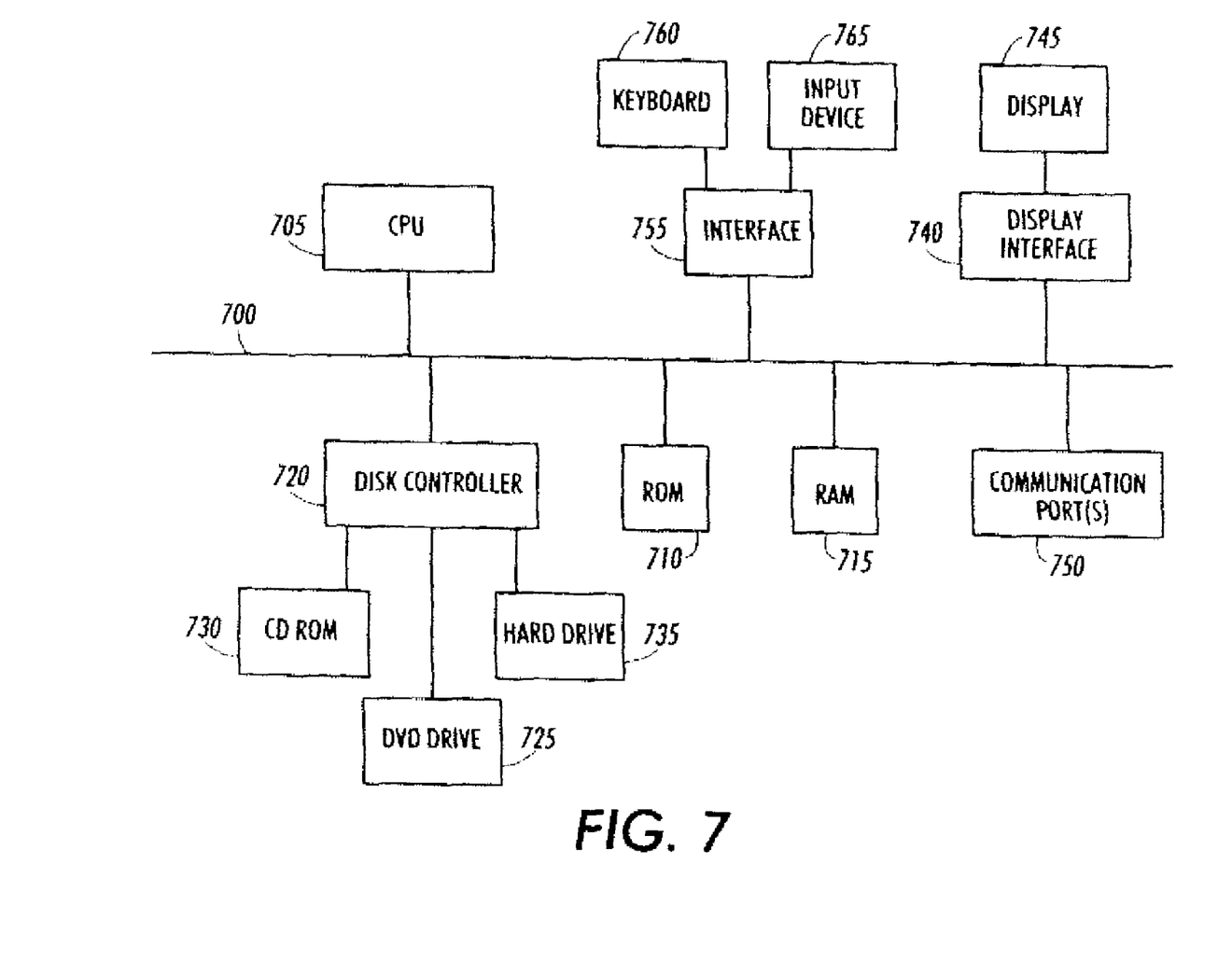
FIG. 7 depicts a block diagram of exemplary internal hardware that may be used to contain or implement the program instructions according to an embodiment.

FIG. 7 depicts a block diagram of exemplary internal hardware of a computing device that may be used to contain or implement the program instructions according to an embodiment. A computing device processes data to perform one or more functions. A computing device may be any processor-based device such as, for example, a server, a personal computer, a personal digital assistant, a web-enabled phone, a smart terminal and a dumb terminal. A computing device may also include, but is not limited to, a computer, cell phone, personal digital assistant, gaming system, and/or other electronic device capable of communicating in a networked environment.

Referring to FIG. 7, a bus 700 serves as the main information highway interconnecting the other illustrated components of the hardware. CPU 705 is the central processing unit of the system, performing calculations and logic operations required to execute a program. Read only memory (ROM) 710 and random access memory (RAM) 715 constitute exemplary memory devices.

A disk controller 720 interfaces with one or more optional disk drives to the system bus 700. These disk drives may include, for example, external or internal DVD drives 725, CD ROM drives 730 or hard drives 735. As indicated previously, these various disk drives and disk controllers are optional devices.

Program instructions may be stored in the ROM 710 and/or the RAM 715. Optionally, program instructions may be stored on a computer readable medium such as a compact disk or a digital disk or other recording medium, a communications signal or a carrier wave.

An optional display interface 740 may permit information from the bus 700 to be displayed on the display 745 in audio, graphic or alphanumeric format. Communication with external devices may occur using various communication ports 750. An exemplary communication port 750 may be attached to a communications network, such as the Internet or an intranet.

In addition to the standard computer-type components, the hardware may also include an interface 755 which allows for receipt of data from input devices such as a keyboard 760 or other input device 765 such as a mouse, remote control, pointer and/or joystick.

An embedded system, such as a sub-system within a xerographic apparatus, may optionally be used to perform one, some or all of the operations described herein. Likewise, a multiprocessor system may optionally be used to perform one, some or all of the operations described herein.

In an embodiment, distances between rating distributions may be displayed via a graphical interface, such as display interface 740.

It will be appreciated that various of the above-disclosed and other features and functions, or alternatives thereof, may be desirably combined into many other different systems or applications. Also that various presently unforeseen or unanticipated alternatives, modifications, variations or improvements therein may be subsequently made by those skilled in the art which are also intended to be encompassed by the following claims.

What is claimed is:

1. A method of evaluating customer satisfaction with a plurality of print-related items, the method comprising:
   receiving a plurality of evaluator satisfaction ratings for each print-related item in a set of print-related items, wherein each evaluator satisfaction rating comprises an ordinal scale value;
   for each print-related item:
      determining, by a computing device, based on the received evaluator satisfaction ratings, a rating probability distribution for the print-related item, wherein the rating probability distribution comprises a plurality of probability values, wherein each of the probability values is associated with one of each of the evaluator satisfaction ratings associated with the print-related item, and
      determining, by the computing device, a similarity value between the rating probability distribution for the print-related item and for each other print-related item in the set of print-related items;
   dividing the set of print-related items into one or more clusters based on the corresponding similarity values, wherein each cluster comprises one or more print-related items;
   displaying a comparison of the one or more clusters to a user, wherein the comparison comprises one or more of:
      a comparison of the similarity values between one or more rating probability distributions associated with the one or more print-related items in one or more clusters,
      a comparison of rating variability between one or more rating probability distributions associated with the one or more print related items in one or more clusters, and
      a comparison of one or more average rating probability distributions associated with one or more clusters; and
   allowing the user to select a cluster having an average rating that exceeds an average rating threshold value and a standard deviation that is less than a threshold standard deviation value.

2. The method of claim 1, further comprising:
   allowing the user to select a print-related item from the selected cluster based on the rating probability distribution associated with the print-related item.

3. The method of claim 1, wherein each print-related item in the set of print-related items is provided by a unique vendor.

4. The method of claim 1, wherein determining a rating probability distribution comprises, for each print-related item:
   determining a number of evaluators who selected each rating;
   determining a total number of evaluators who evaluated the print-related item; and
   determining the rating probability distribution for the print-related item by, for each rating, dividing the number of evaluators who selected the rating by the total number of evaluators.

5. The method of claim 1, wherein determining a similarity value comprises:
   determining a value equal to the difference between:
      (i) the entropy of a sum of a product of a weight and a first probability distribution and a product of the weight and a second probability distribution and
      (ii) a sum of a product of the weight and the entropy of the second probability distribution and a product of the weight and the entropy of the second probability distribution;
   wherein the entropy of a probability distribution $p(p_1, p_2, \ldots, p_n)$ equals $-\tau_{i=1}^{n} p_i \log(p_i)$, and the weight is based on information pertaining to the evaluator who rated each print-related item.

6. The method of claim 1, wherein determining a similarity value comprises:
   determining an Euclidian distance between the print-related item and each other print-related item in the set of print-related items.

7. The method of claim 1, wherein determining a similarity value comprises:
   determining a Mallows distance between the print-related item and each other print-related item in the set of print-related items.

8. The method of claim 1, wherein dividing the set of print-related items comprises:
   clustering the plurality of print-related items into one or more clusters based on the computed similarity values.

9. The method of claim 8, wherein:
   clustering comprises performing hierarchical agglomerative clustering; and dividing the set of print-related items comprises determining one or more of a single link metric, a complete link metric and an average link metric.

10. The method of claim 8, wherein the clustering comprises performing K-means clustering.

11. The method of claim 1, wherein displaying a comparison comprises:
    displaying a graph representing differences between the similarity measurements for each print-related item.

12. The method of claim 1, wherein displaying a comparison comprises:
    displaying a dendrogram representing differences between the similarity measurements for each print-related item.

13. The method of claim 1, wherein displaying a comparison comprises:
    for each cluster, displaying a graph representing a cluster rating probability distribution.

14. A system of evaluating a plurality of print-related items, the system comprising:
    a processor;
    a communication port in communication with the processor; and
    a processor-readable storage medium in communication with the processor, wherein the processor-readable storage medium contains one or more programming instructions for performing a method of evaluating customer satisfaction with a plurality of print-related items, the method comprising:
        receiving a plurality of evaluator satisfaction ratings for each print-related item in a set of print-related items, wherein each evaluator satisfaction rating comprises an ordinal scale value,
        for each print-related item:
            determining, based on the received evaluator satisfaction ratings, a rating probability distribution for the print-related item, wherein the rating probability distribution comprises a plurality of probability values, wherein each of the probability values is associated with one of each of the evaluator satisfaction ratings associated with the print-related item, and
            determining a similarity value between the rating probability distribution for the print-related item and for each other print-related item in the set of print-related items,
        dividing the set of print-related items into one or more clusters based on the corresponding similarity values, wherein each cluster comprises one or more print-related items,
        displaying a comparison of the one or more clusters to a user, wherein the comparison comprises one or more of:
            a comparison of the similarity values between one or more rating probability distributions associated with the one or more print-related items in one or more clusters,
            a comparison of rating variability between one or more rating probability distributions associated with the one or more print related items in one or more clusters, and
            a comparison of one or more average rating probability distributions associated with one or more clusters, and
        allowing the user to select a cluster having an average rating that exceeds an average rating threshold value and a standard deviation that is less than a threshold standard deviation value.

15. The system of claim 14, further comprising one or more programming instructions for:
    allowing the user to select a print-related item from the selected cluster based on the rating probability distribution associated with the print-related item.

16. The system of claim 14, wherein the one or more programming instructions for determining a rating probability distribution comprises, for each print-related item, one or more programming instructions for:
    determining a number of evaluators who selected each rating;
    determining a total number of evaluators who evaluated the print-related item; and
    determining a rating probability distribution for the print-related item by, for each rating, dividing the number of evaluators who selected the rating by the total number of evaluators.

17. The system of claim 14, wherein the one or more programming instructions for determining a similarity value comprises one or more programming instructions for:
    determining a value equal to the difference between:
        (i) the entropy of a sum of a product of a weight and a first probability distribution and a product of the weight and a second probability distribution and
        (ii) a sum of a product of the weight and the entropy of the second probability distribution and a product of the weight and the entropy of the second probability distribution;
    wherein the entropy of a probability distribution $p=(p_1, p_2, \ldots, p_n)$ equals $$-\sum_{i=1}^{n} p_i \log(p_i),$$

and wherein the weight is based on information pertaining to the evaluator who rated each print-related item.

18. The system of claim 14, wherein the one or more programming instructions for displaying a comparison comprises one or more programming instructions for:
    displaying a graph representing differences between the similarity measurements for each print-related item.

19. The system of claim 14, wherein the one or more programming instructions for displaying a comparison comprises one or more programming instructions for:
    displaying a dendrogram representing differences between the similarity measurements for each print-related item.

20. The system of claim 14, wherein the one or more programming instructions for displaying a comparison comprises one or more programming instructions for:
    for each cluster, displaying a graph representing a cluster rating probability distribution.

21. A method of evaluating customer satisfaction with a plurality of print-related items, the method comprising:
    receiving a plurality of evaluator satisfaction ratings for each print-related item in a set of print-related items, wherein each evaluator satisfaction rating comprises an ordinal scale value;
    for each print-related item:
        determining, by a computing device, a rating probability distribution for the print-related item by, for each evaluator satisfaction rating except a lowest evaluator satisfaction rating:
            determining a number of evaluators who selected the evaluator satisfaction rating, determining a total number of evaluators who evaluated the print-related item, determining a reduced number of evaluators by subtracting the number of evaluators who selected the lowest evaluator satisfaction rating from the total number of evaluators who evaluated the print-related item, and dividing the number of evaluators who selected the evaluator satisfaction rating by the reduced number of evaluators;

determining, by the computing device, a similarity value between the rating probability distribution for the print-related item and for each other print-related item in the set of print-related items;

dividing the set of print-related items into one or more clusters based on the corresponding similarity values, wherein each cluster comprises one or more print-related items;

displaying a comparison of the one or more clusters to a user, wherein the comparison comprises one or more of:

a comparison of the similarity values between one or more rating probability distributions associated with the one or more print-related items in one or more clusters, a comparison of rating variability between one or more rating probability distributions associated with the one or more print related items in one or more clusters, and a comparison of one or more average rating probability distributions associated with one or more clusters; and allowing the user to select a cluster having an average rating that exceeds an average rating threshold value and a standard deviation that is less than a threshold standard deviation value.

* * * * *